(12) United States Patent
Kim et al.

(10) Patent No.: US 12,055,806 B2
(45) Date of Patent: Aug. 6, 2024

(54) DISPLAY DEVICE

(71) Applicant: LG ELECTRONICS INC., Seoul (KR)

(72) Inventors: Wonsik Kim, Seoul (KR); Dongyoup Kwak, Seoul (KR); Yanghyun Kim, Seoul (KR); Jonghwa Won, Seoul (KR); Jonggon Shin, Seoul (KR); Jongjin Woo, Seoul (KR); Kimun Paik, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/021,452

(22) PCT Filed: Aug. 6, 2021

(86) PCT No.: PCT/KR2021/010401
§ 371 (c)(1),
(2) Date: Feb. 15, 2023

(87) PCT Pub. No.: WO2022/039420
PCT Pub. Date: Feb. 24, 2022

(65) Prior Publication Data
US 2023/0296934 A1    Sep. 21, 2023

(30) Foreign Application Priority Data
Aug. 21, 2020 (KR) .................. 10-2020-0105596

(51) Int. Cl.
*G02F 1/1333* (2006.01)
*H02J 50/12* (2016.01)
*H02J 50/70* (2016.01)

(52) U.S. Cl.
CPC ........ *G02F 1/133334* (2021.01); *H02J 50/12* (2016.02); *H02J 50/70* (2016.02); *G02F 1/133314* (2021.01)

(58) Field of Classification Search
CPC ............ G02F 1/1333; G02F 1/133305; G02F 1/133314; G02F 1/13332; G02F 1/13334
See application file for complete search history.

(56) References Cited

U.S. PATENT DOCUMENTS

2018/0031919 A1* 2/2018 Ryu ..................... H01F 7/0221

FOREIGN PATENT DOCUMENTS

| JP | 2012-38807 A | 2/2012 |
|----|---|---|
| JP | 2014/167527 A | 9/2014 |
| KR | 10-2018-0011983 | 2/2018 |
| KR | 10-2019-0132954 A | 11/2019 |
| WO | WO 2020/040923 A1 | 2/2020 |

* cited by examiner

*Primary Examiner* — Thoi V Duong
(74) *Attorney, Agent, or Firm* — Birch, Stewart, Kolasch & Birch, LLP

(57) ABSTRACT

Disclosed is a display device, including a body frame having a transmitting coil supplying power, a display module having a charging coil supplied with the power from the transmitting coil and located on a front side of the body frame, a fastening part fastening the display module to the body frame with a magnetic force, and a shield part located between the coupling magnet and the charging coil to cut off a magnetic field formed by the fastening unit so as to prevent the magnetic field from affecting the charging coil. Accordingly, the display module can be recharged by wireless charging, thereby facilitating installation of the display module in the body frame.

20 Claims, 10 Drawing Sheets

DISPLAY DEVICE

CROSS REFERENCE TO RELATED APPLICATIONS

This application is the National Phase of PCT/KR2021/010401 filed on Aug. 6, 2021, which claims priority under 35 U.S.C. § 119(a) to Patent Application No. 10-2020-0105596 filed in the Republic of Korea on Aug. 21, 2020, all of which are hereby expressly incorporated by reference into the present application.

TECHNICAL FIELD

The present disclosure relates to a display device including a display panel drivable and rechargeable using a wireless system.

BACKGROUND ART

Recently, display devices that provide various contents and messages via displays, not hardware media such as signboards and posters for outdoor advertisements, are being used. Due to the rapid development of intelligent digital image devices based on LEDs and OLEDs, there are needs for large display devices.

A typical example of a large display is a digital signage. As a communication tool that can induce corporate marketing, advertising, training, and customer experience, the digital signage is a display device that provides specific information as well as broadcasting programs at airports, hotels, hospitals and subway stations.

In particular, a video wall, which is implemented by arranging display panels in a grid shape to implement a large display device, is often used as a large screen in a spacious place such as an exhibition hall and an event hall, or for outdoor advertising purposes.

Since a video wall, also known as a multi-vision, can be used to implement a large screen using small display panels, it is advantageous in reducing the manufacturing cost of a display device and facilitating disassembly and assembly if temporary installation or necessary changes in location and arrangement are required.

Recently, since such material as LED or OLED can emit light by itself without a backlight structure on a backside, it can implement a flexible display panel, whereby a curved display device can be implemented.

DISCLOSURE OF INVENTION

Technical Problem

One technical task of the present invention is to provide a display device including a display panel drivable and rechargeable using a wireless system.

Technical tasks obtainable from the present invention are non-limited by the above-mentioned technical task. And, other unmentioned technical tasks can be clearly understood from the following description by those having ordinary skill in the technical field to which the present invention pertains.

Solution to Problem

Additional advantages, objects, and features of various embodiments for a display device will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a display device according to one embodiment of the present invention may include a body frame and a display module coupled to a front side of the body frame, the display module including a display panel, a coupling magnet located on a backside of the display panel, a charging coil located on the backside of the display panel, and a shield part located between the coupling magnet and the charging coil to cut off a magnetic field of the coupling magnet so as to prevent the magnetic field from affecting the charging coil, the body frame may include a coupling metal fastened to the coupling magnet and a transmitting coil located at a position corresponding to toe charging coil to supply power to the charging coil, and the shield part may have a thickness related to a space between the display module and the body frame.

The shield part may have a thickness related to a sum of a thickness of the coupling magnet and a thickness of the coupling metal.

A plurality of the coupling magnets may be located on a circumference of the display panel, the charging coil may be located at a center of the display panel, and the shield part may be located on a circumference of the charging coil.

The shield part may include a first opening located inside the coupling magnet to expose the charging coil.

The shield part may include heat-dissipating material.

The shield part may include at least one of Fe, Ni, or ferrite.

High heat conductivity material and high magnetic permeability material may configure a layered structure in the shield part, the high heat conductivity material may include at least one of Cu, Ag, Au or Al, and the high permeability material may include at least one of Fe, Ni, or ferrite.

The shield part may have an extended surface area in a manner that unevenness is formed in a direction of the body frame.

The display device may further include a first signal module located on a backside of the display module and a second signal module located at the body frame and disposed to confront the first signal module and perform wireless communication, and the shield part may include a second opening formed at a position related to the first signal module.

The first signal module may be located between the coupling magnet and the charging coil.

The display module may be disposed on the body frame in a manner of configuring a plurality of arrays.

In another aspect of the present disclosure, as embodied and broadly described herein, a display device according to another embodiment of the present invention may include a body frame having a transmitting coil supplying power, a display module having a charging coil supplied with the power from the transmitting coil and located on a front side of the body frame, a fastening part fastening the display module to the body frame with a magnetic force, and a shield part located between the coupling magnet and the charging coil to cut off a magnetic field formed by the fastening unit so as to prevent the magnetic field from affecting the charging coil.

The shield part may have a thickness related to a space between the display module and the body frame.

The fastening part may include a coupling magnet located at one of the display module and the body frame and a coupling metal located at the other to be coupled to the coupling magnet by a magnetic force.

The shield part may include high magnetic permeability material and the high permeability material may include at least one of Fe, Ni, or ferrite.

The shield part may include heat-dissipating material.

The high heat conductivity material and the high magnetic permeability material may configure a layered structure in the shield part, The shield part may have an extended surface area in a manner that unevenness is formed in a direction of the body frame.

In further aspect of the present disclosure, as embodied and broadly described herein, a display device according to further embodiment of the present invention may include a body frame mounted on a floor or attached to a wall and a display module coupled to a front side of the body frame, the display module including a display panel located on a front side, a coupling magnet located in a first area of a backside of the display panel, a charging coil located in a second area of the backside of the display panel, and a shield part located in a third area between the first area and the second area to cut off a magnetic field, the body frame including a coupling magnet fastened to the coupling magnet and a transmitting coil located at a position related to the charging coil to supply power to the charging coil, and the shield part may have a thickness related to a space between the display module and the body frame.

The shield part may include heat-dissipating material.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects of Invention

Accordingly, embodiments of the present invention provide various effects and/or features of a mobile terminal.

Firstly, a display module can be recharged by a wireless charging system, thereby facilitating installation of the display module in a body frame.

Secondly, a magnetic field of a coupling magnet is prevented from affecting wireless charging, thereby raising charging efficiency.

Thirdly, a magnetic field of a coupling magnet and a magnetic field of wireless charging are prevented from affecting wireless communication, thereby enhancing a quality of the wireless communication.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

MODE FOR THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Terms containing ordinal numbers, such as 1, 2, etc., used in this specification, may be used to describe various components, but these components should not be limited by the terms above. These terms are used only to distinguish one component from another.

It will be understood that when an element is referred to as being "connected with" another element in the present specification, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In the present application, terms such as "include" or "has" are used herein and should be understood that they are intended to indicate an existence of several components, functions or steps, disclosed in the specification, and it is also understood that greater or fewer components, functions, or steps may likewise be utilized.

Figure 1:
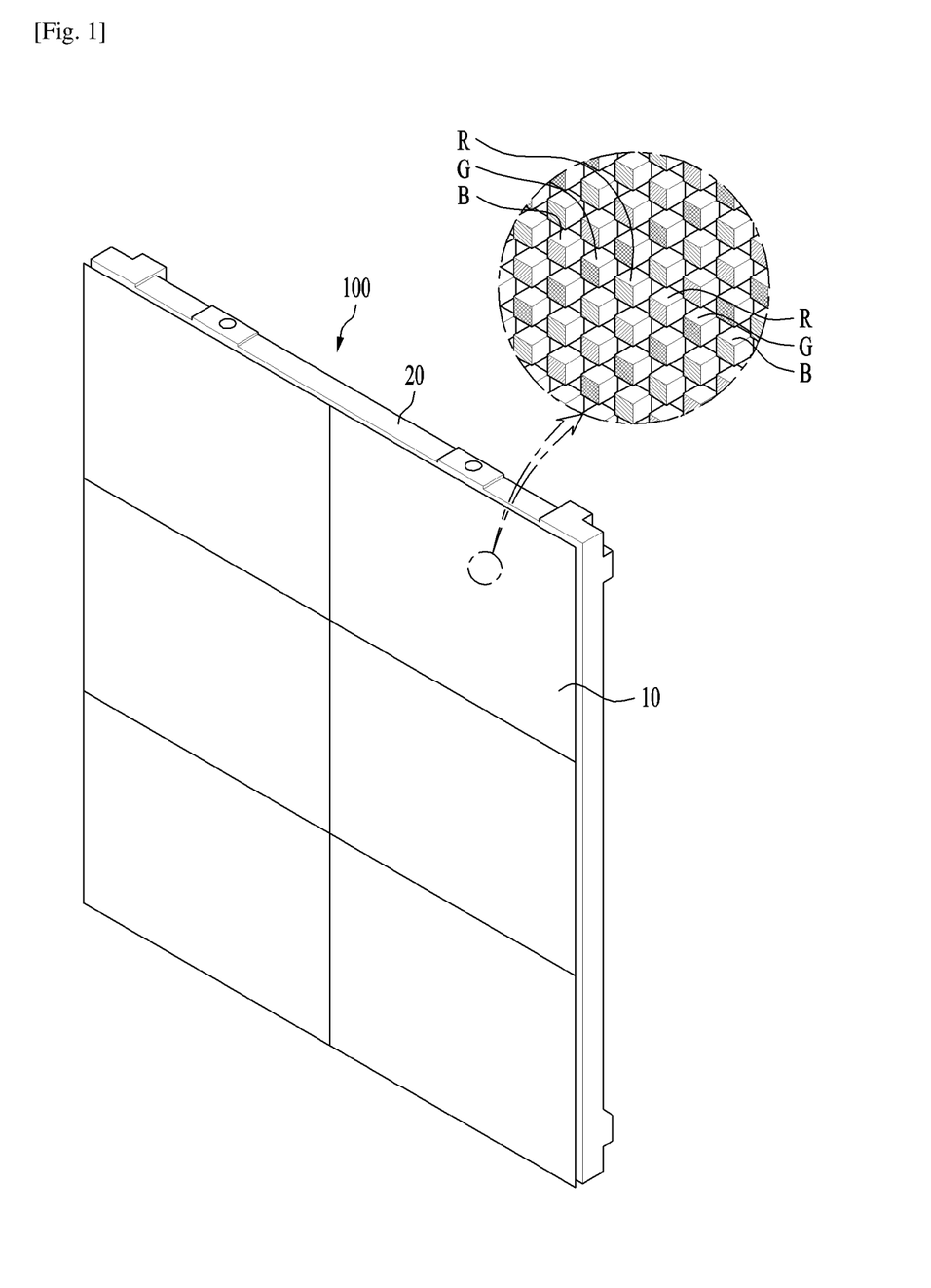
FIG. 1 is a diagram showing a display device according to the present disclosure.

FIG. 1 is a diagram showing a display device according to the present disclosure. A display device includes a body frame and one or more display modules coupled to the body frame. In case that a plurality of display modules (10a to 10f, FIG. 4) exist, the display modules are disposed in a grid shape to embody a large screen. In the drawing, six display modules configure 2×3 array and may be extended in right-left direction or top-bottom direction as necessary.

The body frame to which the display module is coupled may be fixed to a floor or attached to a wall for installation. A rectangular cell corresponding to each display module is formed in the body frame, a horizontal frame and a vertical frame cross with each other to form a cell, or a rectangular cell is stacked to configure the body frame. A cell of the body frame may be configured to correspond to a size and shape of a display module. The frame may contain metal material for rigidity.

Recently, a display device 100 may use a flexible display module 10 such as Light Emitting Diodes (LED) or Organic Light Emitting Diodes (OLED) to implement a curved screen advanced from a planar screen.

The LCD mainly used in the related art is supplied with light via a backlight unit due to the difficulty in emitting light by itself. The backlight unit is a device that uniformly supplies light supplied from a light source to liquid crystals located on a front side. As the backlight unit gets thinner, a compact LCD can be implemented. Yet, it is difficult to implement a backlight unit with flexible material. If the backlight unit is flexed, it is difficult to supply light to liquid crystals uniformly. Hence, it causes a problem that brightness of a screen varies.

On the other hand, in case of LED or OLED, since each device configuring a pixel is self-luminescent, it can be configured bendable owing to absence of a backlight unit. In addition, since each device is self-luminescent, although a position relationship with a neighboring device changed, self-brightness is not affected. Therefore, it is able to implement a flexible display module 10 using LED or OLED.

The OLED (Organic Light Emitting Diodes) display modules 10 have been in-troduced in mid-2010 and are rapidly replacing LCDs in small and medium-sized display markets. OLED is a display made by using self-illumination phenomenon that emits light when current flows in fluorescent organic compound, and there are few af-terimages when implementing a video owing to a faster image quality response speed than LCD.

OLED uses three fluorescent organic compounds, Red, Green, and Blue, which have self-luminescent functions, and it does not need a backlight that reduces color sense because it is a light-emitting display product that uses positive charged particles and electrons injected from cathode and anode, which are combined in the organic compound to emit light by itself.

The LED (Light Emitting Diode) display module 10 employs a technique of using a single LED device as a single pixel, and may implement a flexible display module 10 owing to a smaller size of the LED device than the related art. A device referred to as an LED TV in the related art uses LED as a light source of a backlight unit that supplies light to LCD, but the LED itself fails to configure a screen.

A display module includes a display panel, a coupling magnet located on a backside of the display panel, a first power supply unit and a first signal module. The display panel may include a plurality of pixels (R, G, B). A plurality of the pixels (R, G, B) may be formed in each area where a multitude of data lines and a multitude of gate lines cross with each other. A plurality of the pixels (R, G, B) may be disposed or arranged in a matrix shape.

For example, a plurality of the pixels (R, G, B) may include a Red (R) subpixel, a Green (G) subpixel and a Blue (B) subpixel. A plurality of the pixels (R, G, B) may further include a White (W) subpixel. In a display panel 101, an image displaying side may be referred to as a front or a front side. When the display panel 101 displays an image, an image non-observable side may be referred to as a rear or a rear side.

Figure 2:
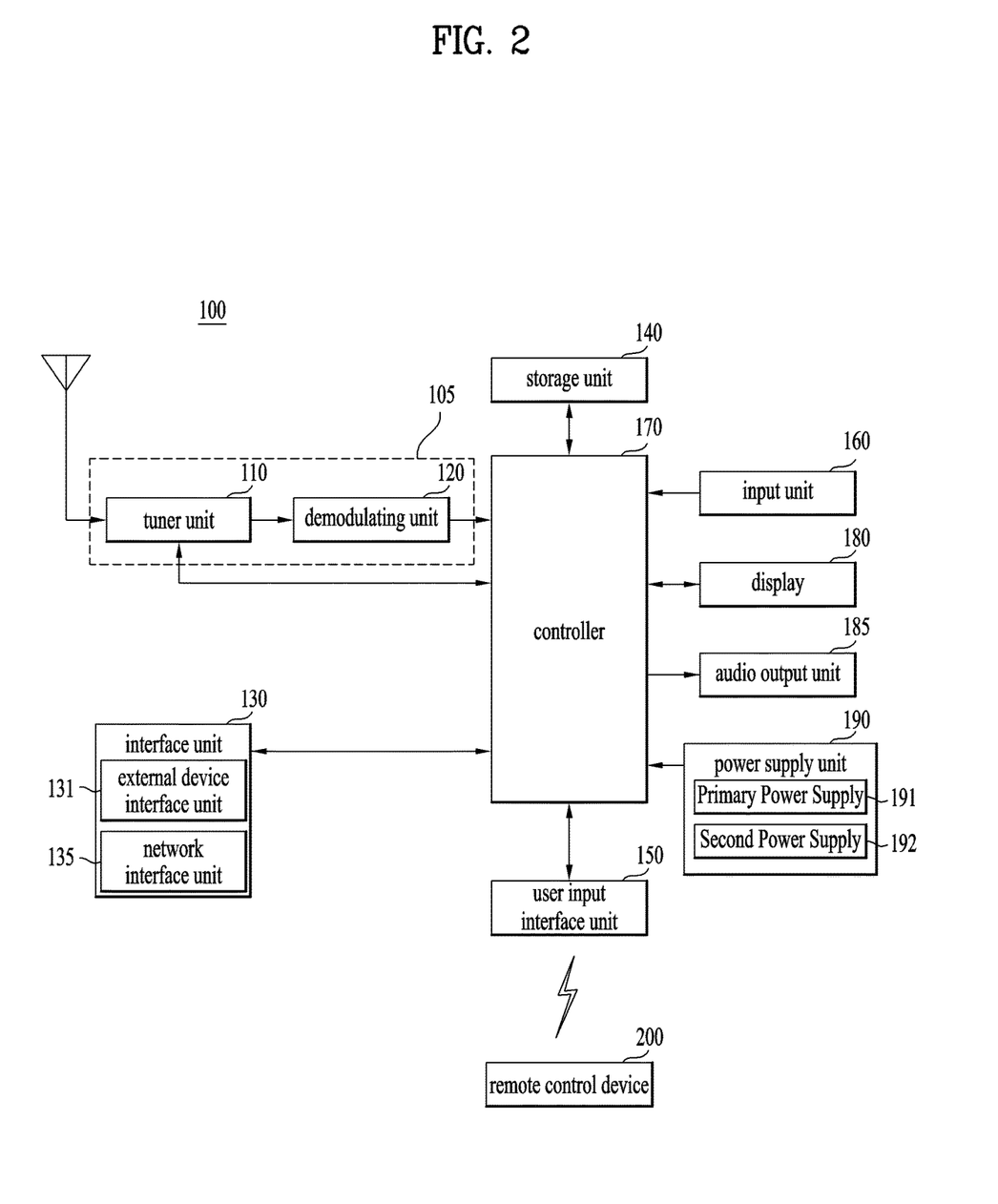
FIG. 2 is a block diagram showing a display device according to the present disclosure.

FIG. 2 is an internal block diagram of the display device 100 shown in FIG. 1. The display device 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulating unit 120.

In some implementations, unlike the drawing, the display device 100 may include the external device interface unit 131 and the network interface unit 135 only among the broadcast receiving unit 105, the external device interface unit 131 and the network interface unit 135. Namely, the display device 100 may not include the broadcast receiving unit 105.

The tuner unit 110 may select a broadcast signal corresponding to a user-selected channel or every pre-saved channel from broadcast signals received via an antenna (not shown) or a cable (not shown). The tuner unit 110 may convert the selected broadcast signal into an intermediate frequency signal, a baseband image or audio signal.

For example, the tuner unit 110 may covert a selected broadcast signal, which is a digital broadcast signal, into a digital IF signal (DIF) or a selected broadcast signal, which is an analog broadcast signal, into an analog baseband image or audio signal (CVBS/SIF). Namely, the tuner unit 110 may process a digital or analog broadcast signal. The analog baseband image or audio signal (CVBS/SIF) outputted from the tuner unit 110 may be directly inputted to the controller 170.

Meanwhile, the tuner unit 110 may sequentially select broadcast signals of all the saved broadcast channels among the received broadcast signals via a channel memory function and then convert them into intermediate frequency signals or baseband image or audio signals.

Meanwhile, to receive broadcast signals of a plurality of channels, the tuner unit 110 may include a plurality of tuners. Alternatively, the tuner unit 110 may include a single tuner configured to receive broadcast signals of a plurality of channels simultaneously.

The demodulating unit 120 may perform a demodulation operation by receiving the digital IF signal (DIF) converted by the tuner unit 110. The demodulating unit 120 may perform demodulation and channel decoding and then output a stream signal (TS). Here, the stream signal may include a signal in which an image signal, an audio signal and/or a data signal are multiplexed together.

The stream signal outputted from the demodulating unit 120 may be inputted to the controller 170. The controller 170 may perform demultiplexing, image/audio signal processing and the like and then output an image and an audio via the display 180 and the audio output unit 185, respectively.

The interface unit 130 plays a role as a passage to external devices of various types connected to the display device 100. The interface unit 130 may include a wireless system using an antenna as well as a wired system of transceiving data through a cable. For example of the wireless system, the aforementioned broadcast receiving unit may be included. A mobile communication signal, a short-range communication signal, a wireless internet signal and the like may be included as well as a broadcast signal.

The external device interface unit 131 may transceive data with a connected external device. To this end, the external device interface unit 130 may include an A/V Input/Output (I/O) unit (not shown).

The interface unit 130 may include at least one of a wire/wireless headset port, an external charger port, a wire/wireless data port, a memory card port, a port connecting an identification module provided device, an audio Input/Output (I/O) port, a video I/O port, an earphone port, etc.

The external device interface unit 131 may be connected by wire/wireless to such an external device as a Digital Versatile Disk (DVD), a Blu ray, a game device, a camera, a camcorder, a computer (notebook), a settop box and the like, and perform an input/output operation with the external device.

In addition, the external device interface unit 131 establishes a communication network with various remote control devices 200, thereby receiving a control signal related to an operation of the display device 100 from the remote control device 200 or transmitting data related to the operation of the display device 100 to the remote control device 200.

The external device interface unit 131 may include a wireless communication unit (not shown) for short-range wireless communication with other electronic devices. Via such a wireless communication unit (not shown), the external device interface unit 130 may exchange data with an adjacent mobile terminal. Particularly, the external device interface unit 131 may receive device information, launched application information, application image and the like from the mobile terminal in mirroring mode.

The network interface unit 135 may provide an interface for connecting the display device 100 to a wire/wireless network including an internet network. For example, the network interface unit 135 may receive contents or data provided by an internet or content provider or a network operator through a network. Meanwhile, the network interface unit 135 may include a communication module (not shown) for connection with the wire/wireless network.

The external device interface unit 131 and/or the network interface unit 135 may include a communication module for short range communication such as Wireless Fidelity (Wi-Fi), Bluetooth, Bluetooth Low Energy (BLE), Zigbee, Near Field Communication (NFC), a communication module for cellular communication such as Long-Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and the like.

The storage unit 140 may store programs for the respective signal processing and control in the controller 170, or store signal processed image, audio and/or data signals. For example, the storage unit 140 may store application programs designed for the purpose of performing various jobs that can be processed by the controller 170, or se-lectively provide some of the stored application programs in response to a request made by the controller 170.

Programs stored in the storage unit 140 may be non-limited if executable by the controller 170. The storage unit 140 may perform a function for temporary storage of image, audio or data signals received from an external device via the external device interface unit 130. The storage unit 140 may store information on a prescribed broadcast channel via a channel memory function such as a channel map and the like.

FIG. 2 shows an embodiment that the storage unit 140 is provided separately from the controller 170, by which the present disclosure is non-limited. Alternatively, the storage unit 140 may be included in the controller 170.

The storage unit 140 may include at least one of volatile memory (e.g., DRAM, SRAM, SDRAM, etc.), non-volatile memory (e.g., flash memory, Hard Disk Drive (HDD), Solid State Drive (SSD), etc.).

The user input interface unit 150 may forward a user-inputted signal to the controller 170 or forward a signal from the controller 170 to a user. For example, the user input interface unit 150 may transmit/receive user input signals such as power on/off, channel selection, screen settings and the like from the remote control device 200, forward user input signals inputted from local keys such as a power key, a channel key, a volume key, a setting key and the like to the controller 170, forward a user input signal inputted from a sensor unit (not shown) sensing a user's gesture to the controller 170, or transmit a signal from the controller 170 to the sensor unit.

The input unit 160 may be provided to one side of the body of the display device 100. For example, the input unit 160 may include a touchpad, a physical button and the like. The input unit 160 may receive various user commands related to operations of the display device 100 and forward a control signal corresponding to an inputted command to the controller 170.

The controller 170 may include at least one processor, and control overall operations of the display device 100 using the included processor. Here, the processor may include a general processor such as a Central Processing Unit (CPU). Of course, the processor may include a dedicated device such as ASIC or a different hardware based processor.

The controller 170 may demultiplex a stream inputted through the tuner unit 110, the demodulating unit 120, the external device interface unit 130 or the network interface unit 135 or generate and output a signal for an image or audio output by processing demultiplexed signals.

The display 180 may generate a drive signal by converting an image signal, a data signal, an OSD signal and a control signal, which are processed by the controller 170, an image signal, a data signal, a control signal and the like, which are received from the interface unit 130. The display 180 may include a display panel 181 provided with a plurality of pixels.

A plurality of the pixels provided to the display panel may include subpixels of RGB. Alternatively, a plurality of the pixels provided to the display panel may include subpixels of RGBW. The display 180 may generate a drive signal for a plurality of the pixels by converting the image signal, he data signal, the OSD signal, the control signal and the like, which are processed by the controller 170.

The display 180 may include one of Plasma Display Panel (PDP), Liquid Crystal Display (LCD), Organic Light Emitting Diode (OLED), flexible display and the like, or a 3D display. The 3D display may be classified into a non-glasses type or a glasses type.

In some implementations, the display 180 may be configured with a touchscreen so as to be usable as an input device as well as an output device.

The audio output unit 185 receives an input of a signal audio-processed by the controller 170 and then outputs it as audio.

The image signal image-processed by the controller 170 may be inputted to the display 180 so as to be displayed as an image in response to the corresponding image signal. In addition, the image signal image-processed by the controller 170 may be inputted to an external output device via the external device interface unit 130.

The audio signal processed by the controller 170 may be outputted as audio via the audio output unit 185. The audio signal processed by the controller 170 may be inputted to an external output device via the external device interface unit 130. The controller 170 may include a demultiplexing unit, an image processing unit and the like, not shown in the drawing. This will be described with reference to FIG. 3 later.

Besides, the controller 170 may control overall operations within the display device 100. For example, the controller 170 may control the tuner unit 110 to be tuned to a broadcast corresponding to a user-selected channel or a pre-saved channel.

In addition, the controller 170 may control the display device 100 by a user command inputted via the user input interface unit 150 or an internal program. Meanwhile, the controller 170 may control the display device 100 to display an image. In this case, the image displayed on the display 180 may include a still image or moving images, and more particularly, 2D or 3D images.

In some implementations, the controller 170 may control a prescribed 2D object to be displayed in an image displayed on the display 180. For example, the object may include at least one of a connected web screen (e.g., newspaper, magazine, etc.), Electronic Program Guide (EPG), various menus, a widget, an icon, a still image, moving images, a text, etc.

Meanwhile, the controller 170 may modulate and/or demodulate a signal using Amplitude Shift Keying (ASK) scheme. Here, the Amplitude Shift Keying (ASK) scheme may mean that a signal is modulated by differentiating an amplitude of a carrier according to a data value or that an analog signal is reconstructed into a digital data value according to an amplitude of a carrier.

For example, the controller 170 may modulate an image signal using Amplitude Shift Keying (ASK) scheme and then transmit it via a first wireless communication module 131 and a second wireless communication module 132.

For example, the controller 170 may modulate to process an image signal received via the first wireless communication module 131 or the second wireless communication module 132 using Amplitude Shift Keying (ASK) scheme.

In some implementations, the display device 100 may further include a signal modulating/demodulating unit (not shown) modulating and/or demodulating a signal. In this case, the signal modulating/demodulating unit may be included in each of the first and second wireless communication modules 131 and 132.

Thus, the display device 100 may conveniently transceive signals with another image display device disposed adjacently despite not using a unique identifier such as a Media Access Control (MAC) address or a complicated communication protocol such as TCP/IP.

In some implementations, the display device 100 may further include a photographing unit (not shown). The photographing unit may be implemented with a single camera, by which the present disclosure is non-limited. The photographing unit may be implemented with a plurality of cameras. Meanwhile, the photographing unit may be embedded in a top side of the display 180 or disposed separately. Image information captured by the photographing unit may be inputted to the controller 170.

Based on the image captured by the photographing unit, the controller 170 may recognize a user's location. For example, the controller 170 may obtain a distance (e.g., z-axis coordinate) between the user and the display device 100. Besides, the controller 170 may obtain x-axis coordinate and y-axis coordinate within the display 180 corresponding to the user's location.

The controller 170 may detect a user's gesture based on an image captured by the photographing unit, a signal detected by the sensor unit, or a combination thereof.

The power supply unit 190 may supply the corresponding power across the display device 100. Particularly, power may be supplied to the controller 170 possibly implemented as System On Chip (SOC), the display 180 for image display, the audio output unit 185 for audio output, etc.

Particularly, the power supply unit 190 may include a converter (not shown) converting AC power into DC power and a Dc/Dc converter (not shown) converting a level of the DC power.

Meanwhile, the power supply unit 190 may play a role in being supplied with power externally and then distributing the supplied power to the respective parts. Each of a plurality of the display modules 10 may include a first power supply unit 191 to supply power for driving the display panel 181 of its own. A second power supply unit 192 supplying power to the first power supply unit 191 may be provided to the body frame 20.

In case of using a wire system for transmission of power from the second power supply unit 192 to the first power supply unit 191, when the display module 100 is coupled to the body frame 20, the second power supply unit 192 and the first power supply unit 191 may be connected together.

To further facilitate the supply of power, a wireless charging system is available. The wireless charging may be performed by magnetic resonance in a manner of disposing a pair of coils to overlap each other. In this case, a charging coil 191 and a transmitting coil 192 may be used as the first power supply unit and the second power supply unit, respectively.

If power is applied to the transmitting coil 192 located at the body frame 20, current flows through the transmitting coil 192 to form an electromagnetic field and current flows in the charging coil 191 located in the electromagnetic field formed by the transmitting coil 192, thereby power can be supplied to the respective parts of the display module 10.

The remote control device 200 may transmit a user input to the user input interface unit 150. To this end, the remote control device 200 may use Bluetooth communication, Radio frequency (RF) communication, Infrared Radiation (IR) communication, Ultra-WideBand (UWB) communication, Zigbee, etc. In addition, the remote control device 200 may receive an image, audio or data signal outputted from the user input interface unit 150 and then display it thereon or output it as audio.

In some implementations, the above-described display device 100 may include a stationary or mobile digital broadcast receivable digital broadcast receiver.

Meanwhile, the display device 100 shown in FIG. 2 is provided just for one embodiment of the present disclosure, and the respective components in the block diagram may be combined, added or omitted depending on options of the actually implemented display device 100.

That is, two or more components may be combined into one component, or one component may be subdivided into two or more components, if necessary. Furthermore, the functions performed on each block are intended to describe the embodiment of the present disclosure, and the specific operation or device does not limit the scope of the rights of the present disclosure.

Figure 3:
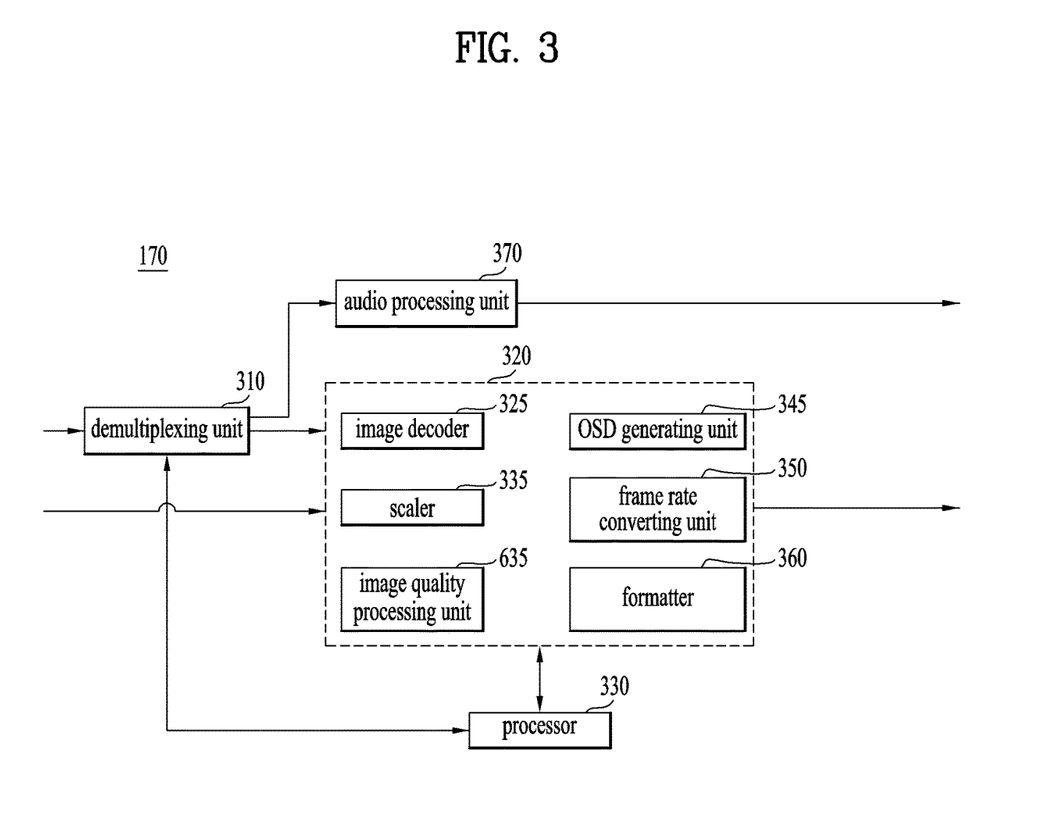
FIG. 3 is an internal block diagram of a controller shown in FIG. 2.

FIG. 3 is an internal block diagram of the controller shown in FIG. 2.

Referring to FIG. 3, the controller 170 according to one embodiment of the present disclosure may include a demultiplexing unit 310, an image processing unit 320, a processor 330 and/or an audio processing unit 370. The controller 170 may further include a data processing unit (not shown).

The demultiplexing unit 310 may demultiplex an inputted stream. For example, when an MPEG-2 TS is inputted, the demultiplexing unit 310 may demultiplex to separate it into image, audio and data signals. Here, the stream signal inputted to the demultiplexing unit 310 may include a stream signal outputted from the tuner unit 110, the demodulating unit 120 or the external device interface unit 130.

The image processing unit 320 may perform signal processing on an inputted image. For example, the image processing unit 320 may perform image processing of an image signal demultiplexed by the demultiplexing unit 310.

To this end, the image processing unit 320 may include an image decoder 325, a scaler 335, an image quality processing unit 635, an image encoder (not shown), an OSD generating unit 340, a frame image rate converting unit 350, a formatter 360 and/or the like.

The image decoder 325 may decode the demultiplexed image signal, and the scaler 335 may perform scaling on the resolution of the decoded image signal to be out-puttable from the display 180.

The image decoder 325 may include decoders of various specifications. For example, an MPEG-2 decoder, an H.264 decoder, a 3D image decoder for a color image and a depth image, a decoder for a multi-view image and the like may be included.

The scaler 335 may scale an input image signal, of which image decoding was completed in the image decoder 325 and the like. For example, the scaler 335 may perform upscaling in case of a small side of resolution of the input image signal or downscaling in case of a large size or resolution of the input image signal.

The image processing unit 635 may perform image quality processing on the input image signal, of which image decoding was completed in the image decoder 325 and the like. For example, the image quality processing unit 635 may perform noise can-cellation processing of the input image signal, extend resolution of a gray scale of the input image signal, perform image resolution improvement, perform High Dynamic Range (HDR) based signal processing, vary a frame image rate, perform image quality processing corresponding to panel property, and more particularly, to an organic light emitting panel, etc.

The OSD generating unit 340 may generate an OSD signal by itself or in response to a user input. For example, based on a user input signal, the ODD generating unit 340 may generate a signal for displaying various information as graphic or text on a screen of the display 180. The generated OSD signal may include various data of a user interface screen of the image display device 100, various menu screens, widgets, icons and the like. Moreover, the generated OSD signal may include a 2D or 3D object.

In addition, the OSD generating unit 340 may generate a pointer, which id dis-playable on the display, based on a pointing signal inputted from the remote control device 200. Particularly, such a pointer may be generated by a pointing controller (not shown) that may be included in the OSD generating unit 240. Alternatively, of course, the pointing controller (not shown) may be separately provided instead of being provided within the OSD generating unit 240.

A frame image rate converting unit (Frame Rate Converter, FRC) 350 may convert a frame image rate of an inputted image. Meanwhile, the frame image rate converting unit 350 may output an inputted image intactly without separate frame image rate conversion.

Meanwhile, the formatter 360 may change a format of an inputted image signal into an image signal to display on the display and then output the corresponding signal. Particularly, the formatter 360 may change a format of an image signal to correspond to the display panel.

The processor 330 may control overall operations in the image display device 100 or the controller 170. For example, the processor 330 may control the tuner 110 to be tuned to an RF broadcast corresponding to a user-selected channel or a pre-saved channel.

The processor 330 may control the image display device 100 by a user command inputted via the user input interface unit 150 or an internal program. The processor 330 may data transmission control with the network interface unit 135 or the external device interface unit 130. The processor 330 may control operations of the demultiplexing unit 310, the image processing unit 320 and the like within the controller 170.

Meanwhile, the audio processing unit 370 in the controller 170 may perform audio processing of a demultiplexed audio signal. To this end, the audio processing unit 370 may include various decoders. The audio processing unit 370 in the controller 170 may process base, treble, volume adjustment, etc.

A data processing unit (not shown) in the controller 170 may perform data processing of a demultiplexed data signal. For example, in case that the demultiplexed data signal is an encoded data signal, it can be decoded. The encoded data signal may include electronic program guide information including broadcast information such as start and end times of a broadcast program broadcasted on each channel and the like.

Meanwhile, the block diagram of the controller 170 shown in FIG. 3 is a block diagram for one embodiment of the present disclosure. The respective components of the block diagram may be combined, added or omitted depending on options of the controller 170 implemented actually. Particularly, the frame image rate converting unit 350 and the formatter 360 may be separately provided outside the image processing unit.

Figure 4:
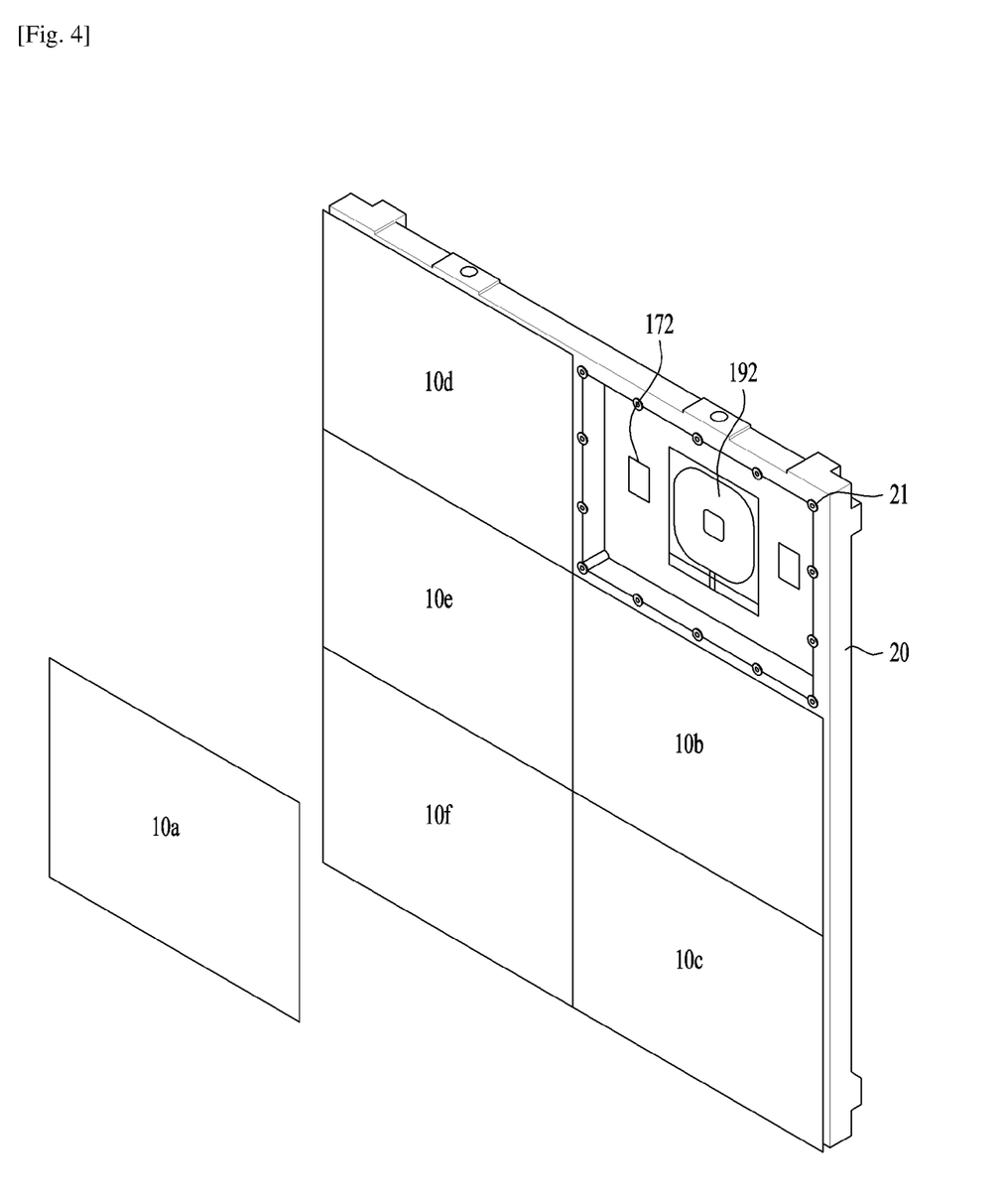
FIG. 4 is a diagram showing how to couple a display module to a body frame in a display device according to the present disclosure.
Figure 5:
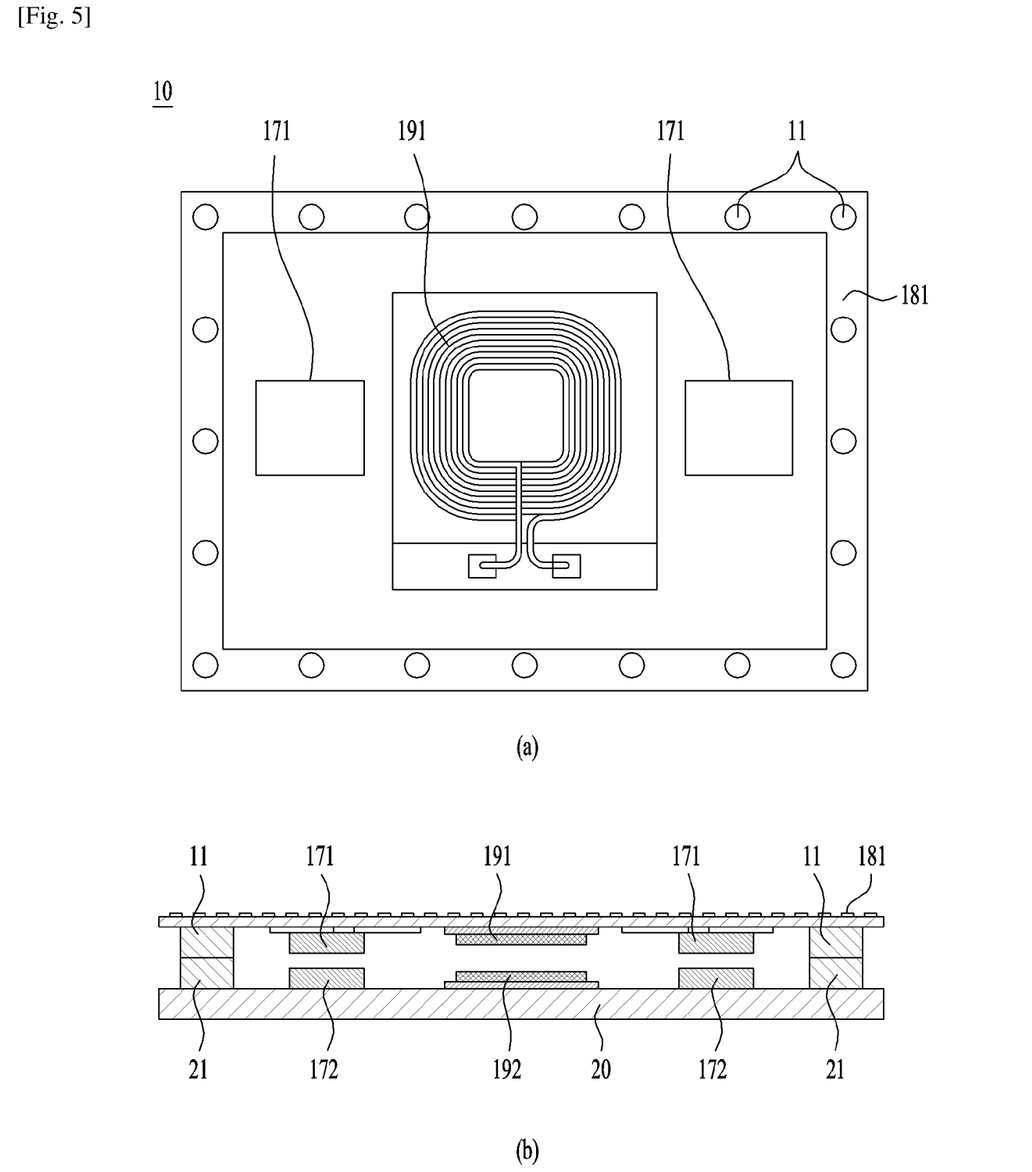
FIG. 5 is a backside diagram of a display module and a cross-sectional diagram showing a state that the display module is coupled to a body frame.

FIG. 4 is a diagram showing how to couple the display module 10 of the display device 100 of the present disclosure to the body frame 20, in which one of the display modules is separated from the body frame 20 so as to expose a cell of the body frame 20. FIG. 5 is a backside diagram of the display module 10 and a cross-sectional diagram showing a state that the display module 10 is coupled to the body frame 20.

The body frame 20 is installed on a floor or wall, and a plurality of the display modules 10 are disposed on a front side. The body frame 20 may include a body controller configured to provide image information in a manner of dividing the image information to enable a plurality of the display modules 10 to configure a single screen and control each of the display modules 10 for uniform brightness and chroma.

The display module 10 may include a first signal module 171 to receive an image signal and a control command from the body controller 170, and the body frame 20 may include a second signal module 172 connected to the first signal module 171. Here, the connection may include wireless connection as well as wired connection.

In case that the first and second signal modules 171 and 172 are connected to each other by wire, when the display module 10 is coupled to the body frame 20, the first signal module 171 and the second signal module 172 may be fastened to each other.

In case of using wireless signals, the first signal module 171 and the second signal module 172 may be spaced apart from each other instead of being connected physically. Yet, to avoid interference with a signal transmitted from a first signal module 171 of a neighboring display module 10, the first signal module 171 and the second signal module 172 may be disposed adjacently. Hence, the first signal module 171 and the second signal module 172 may transceive signals with each other by short-range wireless communication.

In order to adjacently dispose the first signal module 171 and the second signal module 172, the first signal module 171 may be located on the backside of the display panel 181 and the second signal module 172 may be disposed at a position, which confronts the first signal module 171 when the display module 10 is mounted on the body frame 20, i.e., in a direction toward the display module 10.

The body controller may transmit a signal to each display module 10 via the second signal module 172 and check a state of the corresponding display module 10. One or more first signal modules 171 may be provided to each cell to which the display module 10 is coupled. As a different channel is usable depending on a type of a signal, as shown in FIG. 4, two or more first signal modules 171 may be included.

In order to facilitate the display module 10 to be fastened to the body frame 20, a magnetic force of a coupling magnet 11 can be used. The coupling magnet 11 is provided to the display module 10 and a coupling metal 21 is disposed at a position of the body frame 20 corresponding to the coupling magnet 11, whereby the display module 10 is fixed to the body frame 20 owing to the magnetic force of the coupling magnet. By adjusting a position of the coupling metal 21 on the body frame 20, spaces and heights among a plurality of the display modules 10 may be adjusted. The positions of the coupling magnet 11 and the coupling metal 21 may be switched to each other.

As shown in FIG. 5, in the display module 10, a first power supply unit supplying power to device each pixel of the display panel 181 may be located on a backside of the display panel 181. The first power supply unit may be supplied with power from a second power supply unit located at the body frame 20. Like the first and second signal modules 171 and 172, the first and second power supply units may be connected by wire or wireless.

Wireless charging may employ magnetic induction or magnetic resonance. According to the magnetic induction, if current flows in a transmitting coil 182, a magnetic field is formed so that current can flow in a charging coil 192 located within the magnetic field, whereby charging is enabled. The magnetic resonance corresponds to a short-range charging scheme due to the requirement of the location within the magnetic field. If a distance between the transmitting coil 192 and the charging coil gets shorter and a center position alignment between them is maintained more ac-curately, charging efficiency becomes higher.

The first power supply unit and the second power supply unit may include the charging coil 191 and the transmitting coil 192, respectively. Referring to FIG. 5 (b), the transmitting coil 192 and the charging coil 191 are spaced apart from each other. To complement this, a sill is formed on at least one side of the charging coil 191 or the transmitting coil 192, whereby a distance between the two coils can be decreased.

Magnetic resonance may be performed in a distance farther than magnetic induction. As current flows in a transmitting coil, an electromagnetic field is formed, which is similar to magnetic induction. Yet, the current can be transmitted far away in a manner of being carried on a resonance frequency.

Power can be supplied to the display module in a manner that current flows in a single transmitting coil 192 so as to enable current to flow in a plurality of the charging coils 191 of the display module 10. The magnetic resonance may affect another neighboring electromagnetic field and have low efficiency disadvantageously.

The display device 100 of the present embodiment uses magnetic resonance and includes the charging coil 191 and the transmitting coil 192 adjacent to each other.

Each of the transmitting coil 192 and the charging coil 191 may include a coil antenna including a spirally wound metal line. As a magnetic field is formed in a direction vertical to a spiral plane having a coil wound therein, the transmitting coil 192 and the charging coil 191 may be disposed on the front side of the body frame 20 and the backside of the display module 10, respectively, whereby the spiral planes can confront each other.

FIG. 5 (b) is a cross-sectional diagram showing that the display module 10 is coupled to the body frame 20, which the coupling metal 21 is fixed by the magnetic force of the coupling magnet 11 of the display unit. Although the drawing shows that the coupling metal 21, the transmitting coil 192 and the second signal module 172 are coupled in the same plane, the coupling metal 21 may be coupled to a projected position of a circum-ferential part of a cell. In case that the coupling metal 21 is disposed at the frame of the circumference of the cell, if the thickness of the frame is regarded as included in the thickness of the coupling metal 21, both of the thickness of the coupling metal 21 and the thickness of the coupling magnet 11 determine a space between the first signal module 171 and the second signal module 172 and a space between the transmitting coil 192 and the charging coil 191.

Charging and signal transmission may be separately performed by wireless. Alternatively, using a single signal, a signal can be transmitted as soon as charging is performed. In this case, the charging coil 191 and he first signal module 171 may be combined together, and the transmitting coil and the second signal module 172 may be combined. Yet, separately performing signal transmission and charging can reduce signal error and raise charging efficiency rather than simultaneously performing signal transmission and charging. Hence, according to the present embodiment, the charging coil 191 and the first signal module 171 are provided separately as well as the transmission coil 192 and the second signal module 172 are provided separately.

Figure 6:
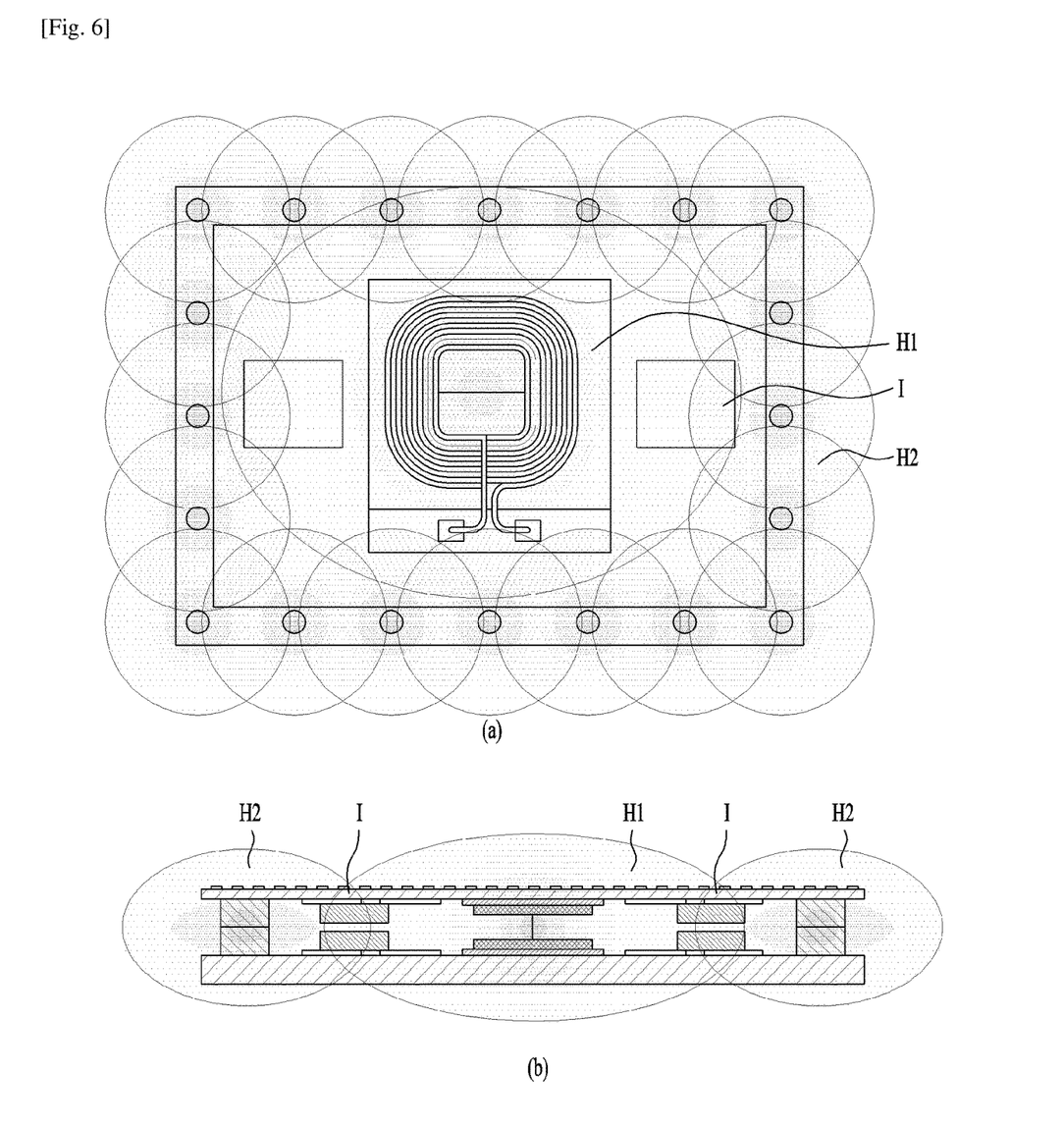
FIG. 6 is a diagram showing the distribution of a magnetic field of the display module shown in FIG. 5.

FIG. 6 is a diagram showing the magnetic field distribution of the display module 10 shown in FIG. 5. As described above, according to the principle of wireless charging, the transmitting coil 192 forms a magnetic field and current flows in the charging coil 191 having received energy via the magnetic field. Therefore, the magnetic field formed by the transmitting coil 192 should be maintained stably.

The coupling magnet 11 configured to couple the display module 10 to the body frame 20 also forms a magnetic field with a permanent magnet, thereby affecting the other magnetic field formed by the transmitting coil 192. In FIG. 6, the magnetic field H1 formed by the transmitting coil 192 and the magnetic field H2 formed by the coupling magnet 11 may overlap each other, thereby causing a problem that charging efficiency is lowered in the overlapping area I.

Figure 7:
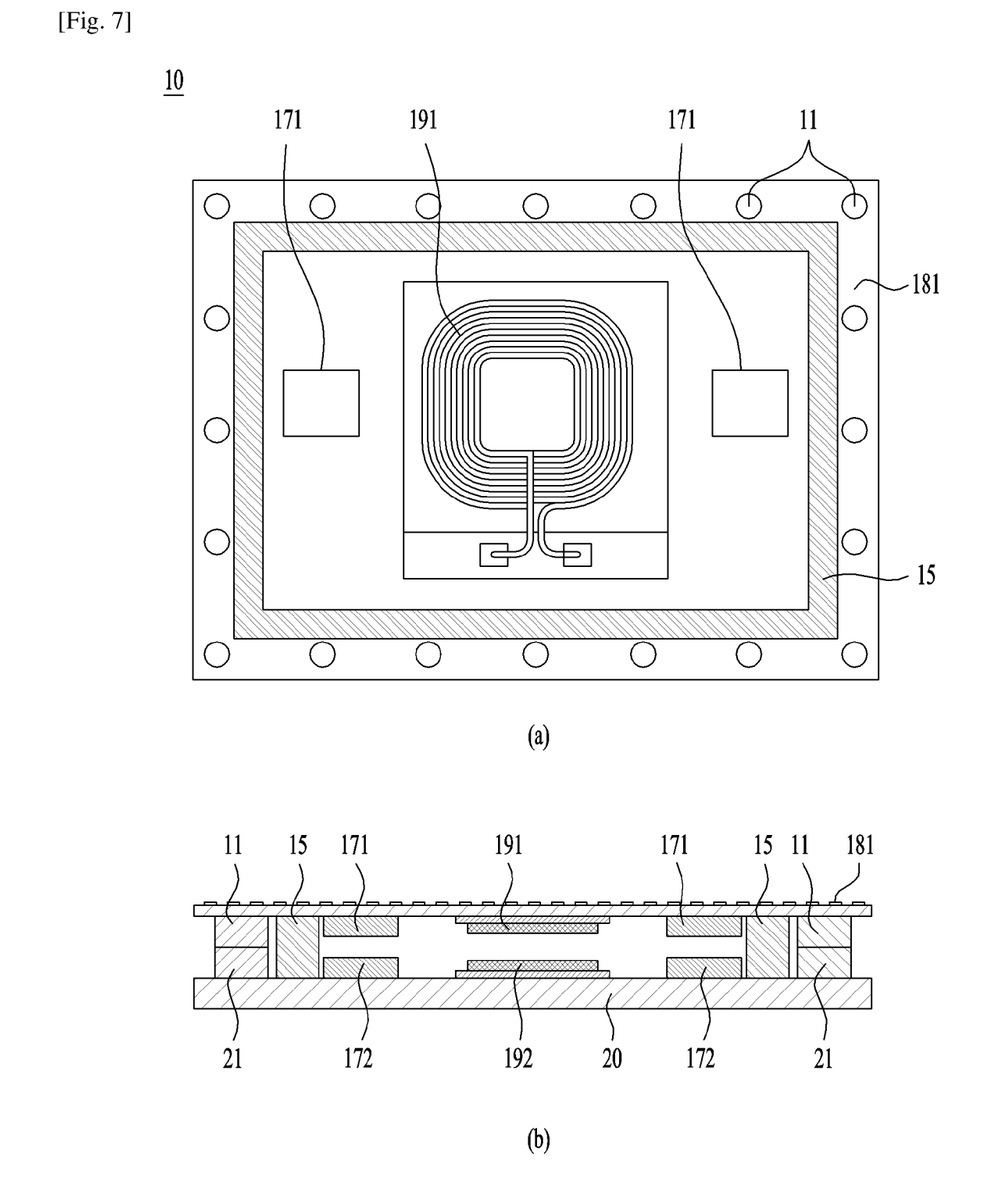
FIG. 7 is a backside diagram of a display module having a shield part and a cross-sectional diagram showing a state that the display module is coupled to a body frame.

To solve the above problem, a shield part 15 configured to cut off the magnetic field may be provided between the coupling magnet 11 and the charging coil 191. FIG. 7 is a backside diagram of the display module 10 having the shield part 15 and a cross-sectional diagram showing a state that the display module 10 is coupled to the body frame 20.

Figure 8:
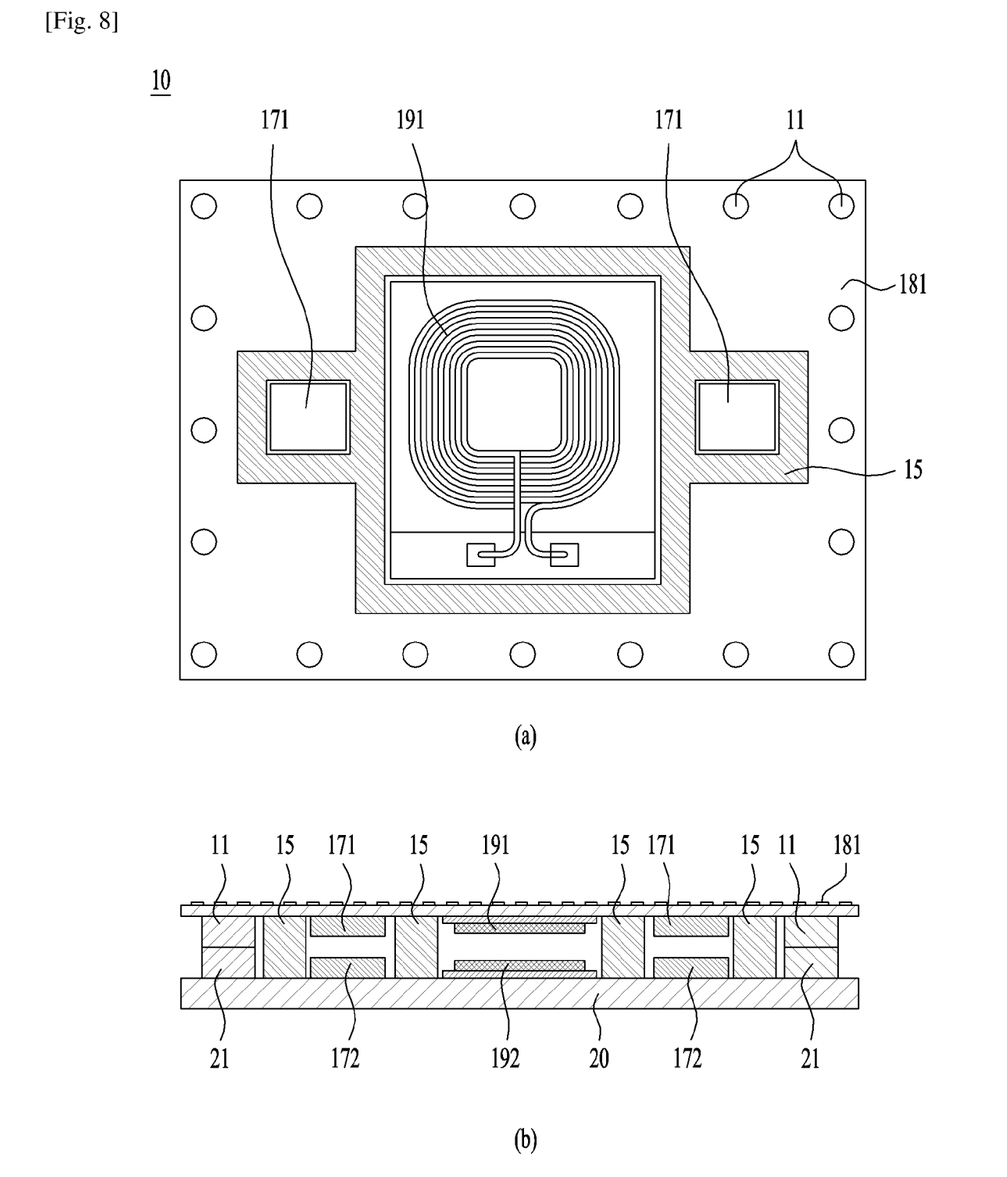
FIG. 8 and FIG. 9 are backside diagrams and cross-sectional diagrams showing other examples of a shield part.

The shield part 15 may be configured in a partition shape located between the coupling magnet 11 and the charging coil 191 so as to avoid the influence caused to the charging coil 191 by the magnetic field. According to the embodiment shown in FIG. 7 (*a*), the shield part 15 is disposed adjacent to the coupling magnet. Alternatively, as shown in FIG. 8 (*a*), the shield part 15 may be configured adjacent to a circumference of the charging coil 191.

In case of coupling to the body frame 20, as shown in FIG. 7 (*b*), to enable an end portion to touch the body frame 20, the thickness of the shield part 15 may be formed thicker than the coupling magnet 11. The shield part 15 may be coupled to the backside of the display module 10 or located at the body frame 20. The thickness of the shield part 15 may be formed to correspond to a space between the body frame 20 and the backside of the display module 10

In case that the front side of the body frame 20 and the backside of the display module 10 are planar, the thickness of the shield part 15 may be formed to correspond to a thickness sum of the coupling magnet 11 and the coupling metal 21.

In case that the thickness of the shield part 15 corresponds to a space between the body frame 20 and the backside of the display module 10, it does not matter whether the shield part 15 may be coupled to the backside of the display module 10 or the front side of the body frame 20.

Yet, due to the installation of the body frame 20, the thickness of the shield part 15 is smaller than the space between the backside of the display module 10 and the body frame 20, thereby being possibly spaced apart on one side. In this case, since it is important to reduce interference on the side of the charging coil 101, the shield part 15 is advantageously coupled to the backside of the display module 10.

The magnetic field may be cut off using the substance of high magnetic permeability, which is more difficult than an electric field. Hence, the magnetic field may be reduced rather than cut off thoroughly. The substance of high magnetic permeability may include iron, nickel, etc. If the magnetic field passes through the shield part 15, electrons are aligned in the shield part 15 so as to be magnetized. Thus, as a magnetic field of the magnetized shield part 15 overlaps, the magnetic field is cancelled.

The shield part 15 may include a ferrite component that cuts off a magnetic field. Ferrite is an allotrope of iron and means magnetic ceramic containing iron oxides. The ferrite has the same substance of a magnet but fails to be attached to iron like the magnet.

Although the magnetic field formed by the first and second signal modules 171 and 172 performing wireless communication is not as strong as the magnetic field of the transmitting coil, it may be affected by the magnetic field attributed to the wireless charging of the transmitting coil, thereby causing noise to a wireless signal.

Figure 9:
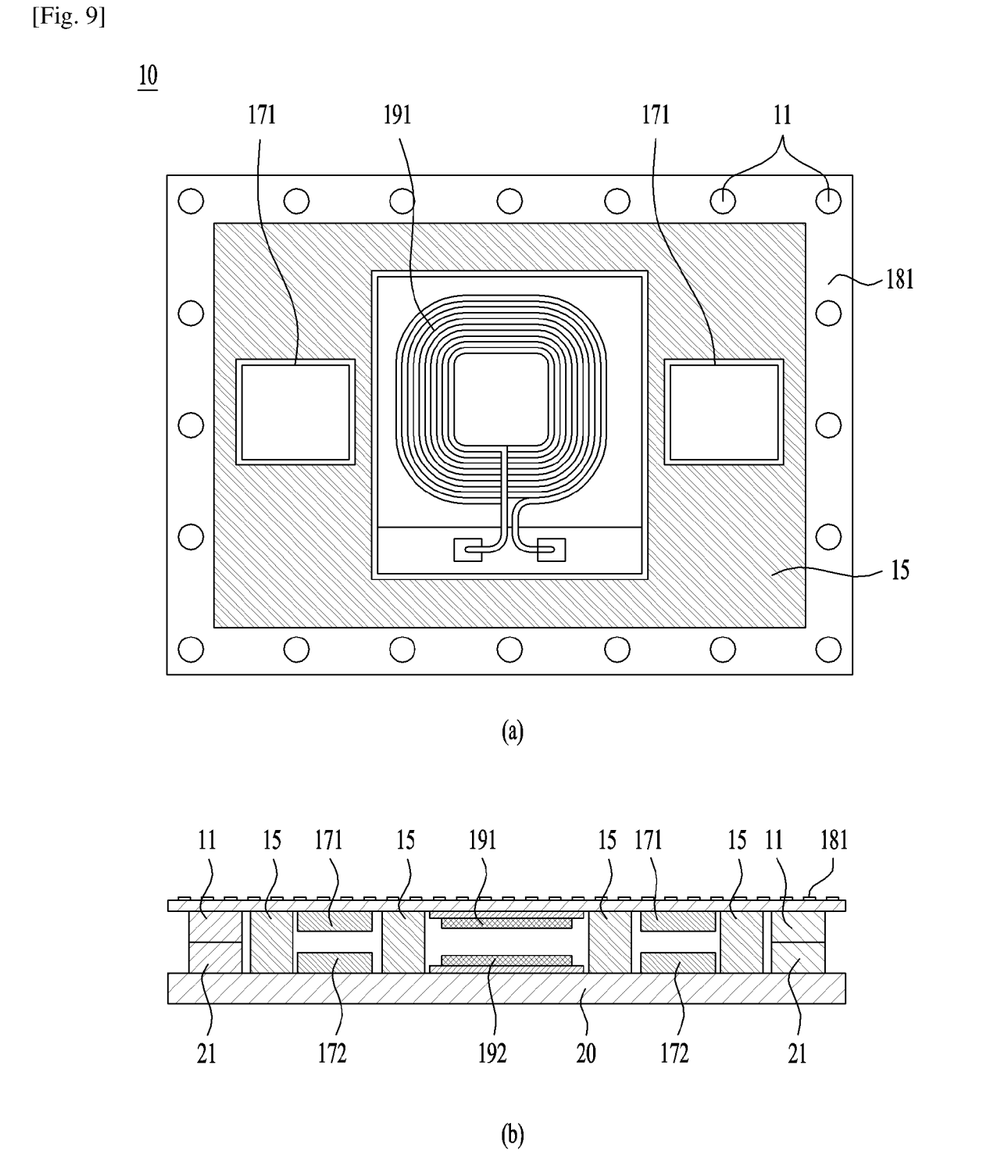

FIG. 8 and FIG. 9 are backside diagrams and cross-sectional diagrams showing other examples of the shield part 15 of the display module 10. To raise a quality of wireless communication between the first signal module 171 and the second signal module 172, the shield part 15 may be formed on a circumference of the first signal module 171. As shown in FIG. 8, the shield part 15 may be configured in a manner of enclosing the charging coil 191 and the circumference of the first signal module 171 to protect.

Alternatively, as shown in FIG. 9, the shield part 151 15 may be located inside an area in which the coupling magnet 11 is formed and configured to include a first opening formed at a position corresponding to the charging coil 191 and a second opening formed at a position corresponding to the first signal module 171.

The shield part 15 of the type shown in FIG. 9 can cover the whole backside of the display module 10, thereby playing a role as a cover of the display module 10. The cover of the display module 10 may include a heat radiation function to discharge heat generated from the display panel 181 of the display module 10 as well as protect the backside of the display panel 181.

As heat radiation material, high heat conductivity metal such as Cu, Ag, Au, Al and the like may be included. Yet, such metal of high heat conductivity has low magnetic permeability, thereby having difficulty in functioning as shield substance. Hence, metal of high heat conductivity and metal of high magnetic permeability are disposed in a layered structure or arranged alternately, thereby improving heat radiation performance and magnetic field cut-off performance.

Figure 10:
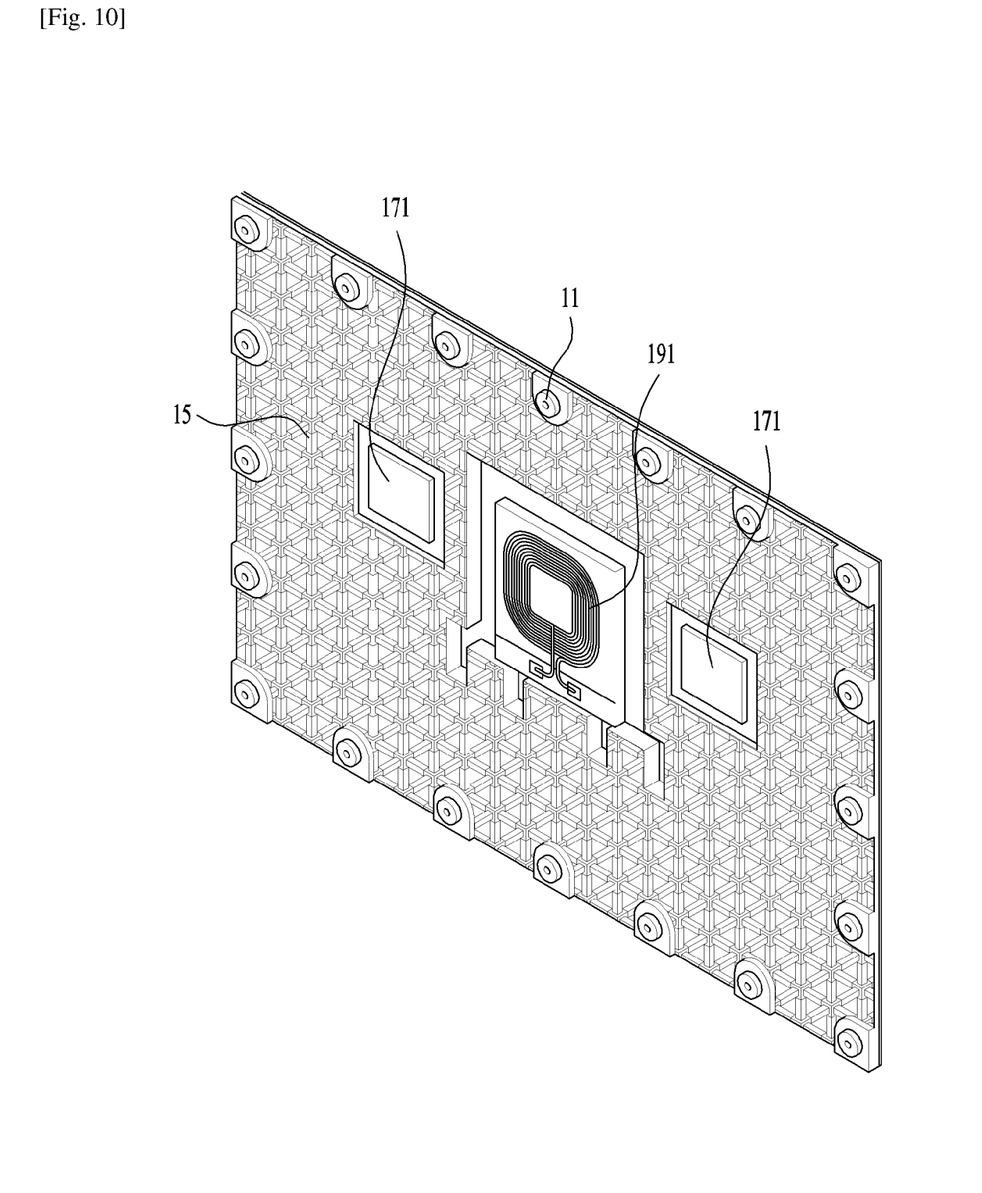
FIG. 10 is a perspective diagram of a backside of a display module to show another example of a shield part.

To raise heat radiation performance, unevenness is formed on the shield part 15 to increase a heat radiation area. FIG. 10 is a perspective diagram showing a backside of the display module 10 to show another example of the shield part 15. As unevenness is formed on the backside of the shield part 15, an air-contact area is increased, thereby increasing a heat radiation effect.

Since the display module 10 can be recharged by wireless charging, the installation of the display module 10 is facilitated in a manner of attaching the display module 10 to the main frame 20 only without separate cable connection.

Since the influence caused to wireless charging by the magnetic field of the coupling magnet 11 can be cut off, charging efficiency can be raised.

The effects caused to wireless communication by the magnetic field of the coupling magnet and the magnetic field of the wireless charging can be cut off, thereby raising a quality of the wireless communication.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

The invention claimed is:

1. A display device, comprising:
a body frame; and
a display module coupled to a front side of the body frame, the display module comprising:
a display panel;
a coupling magnet located on a backside of the display panel;
a charging coil located on the backside of the display panel; and
a shield part located between the coupling magnet and the charging coil to cut off a magnetic field of the coupling magnet so as to prevent the magnetic field from affecting the charging coil, wherein the body frame comprises a coupling metal fastened to the coupling magnet and a transmitting coil located at a position corresponding to the charging coil to supply power to the charging coil and wherein the shield part has a thickness related to a space between the display module and the body frame.

2. The display device of claim 1, wherein the shield part has a thickness related to a sum of a thickness of the coupling magnet and a thickness of the coupling metal.

3. The display device of claim 1, wherein a plurality of the coupling magnets are located on a circumference of the display panel, wherein the charging coil is located at a center of the display panel, and wherein the shield part is located on a circumference of the charging coil.

4. The display device of claim 1, wherein the shield part comprises a first opening located inside the coupling magnet to expose the charging coil.

5. The display device of claim 1, wherein the shield part comprises heat-dissipating material.

6. The display device of claim 1, wherein the shield part comprises at least one of Fe, Ni, or ferrite.

7. The display device of claim 1, wherein high heat conductivity material and high magnetic permeability material configure a layered structure in the shield part, wherein the high heat conductivity material comprises at least one of Cu, Ag, Au or Al, and wherein the high permeability material comprises at least one of Fe, Ni, or ferrite.

8. The display device of claim 1, wherein the shield part has an extended surface area in a manner that unevenness is formed in a direction of the body frame.

9. The display device of claim 1, further comprising:
a first signal module located on a backside of the display module; and
a second signal module located at the body frame and disposed to confront the first signal module and perform wireless communication,
wherein the shield part comprises a second opening formed at a position related to the first signal module.

10. The display device of claim 9, wherein the first signal module is located between the coupling magnet and the charging coil.

11. The display device of claim 1, wherein the display module is disposed on the body frame in a manner of configuring a plurality of arrays.

12. A display device, comprising:
a body frame having a transmitting coil supplying power;
a display module having a charging coil supplied with the power from the transmitting coil and located on a front side of the body frame;
a fastening part fastening the display module to the body frame with a magnetic force; and
a shield part located between the fastening part and the charging coil to cut off a magnetic field formed by the fastening unit so as to prevent the magnetic field from affecting the charging coil.

13. The display device of claim 12, wherein the shield part has a thickness related to a space between the display module and the body frame.

14. The display device of claim 12, the fastening part comprising:
a coupling magnet located at one of the display module and the body frame; and
a coupling metal located at the other to be coupled to the coupling magnet by a magnetic force.

15. The display device of claim 12, wherein the shield part comprises high magnetic permeability material and wherein the high permeability material comprises at least one of Fe, Ni, or ferrite.

16. The display device of claim 15, wherein the shield part comprises heat-dissipating material.

17. The display device of claim 16, wherein the high heat conductivity material and the high magnetic permeability material configure a layered structure in the shield part.

18. The display device of claim 12, wherein the shield part has an extended surface area in a manner that unevenness is formed in a direction of the body frame.

19. A display device, comprising:
a body frame mounted on a floor or attached to a wall; and
a display module coupled to a front side of the body frame,
the display module comprising:
a display panel located on a front side;
a coupling magnet located in a first area of a backside of the display panel;
a charging coil located in a second area of the backside of the display panel; and
a shield part located in a third area between the first area and the second area to cut off a magnetic field,
the body frame comprising:
a coupling magnet fastened to the coupling metal; and
a transmitting coil located at a position related to the charging coil to supply power to the charging coil,
wherein the shield part has a thickness related to a space between the display module and the body frame.

20. The display device of claim 19, wherein the shield part comprises heat-dissipating material.

* * * * *